United States Patent
Bruce et al.

(10) Patent No.: US 9,971,524 B1
(45) Date of Patent: May 15, 2018

(54) SCATTER-GATHER APPROACH FOR PARALLEL DATA TRANSFER IN A MASS STORAGE SYSTEM

(71) Applicant: BiTMICRO Networks, Inc., Fremont, CA (US)

(72) Inventors: Ricardo H. Bruce, Fremont, CA (US); Avnher Villar Santos, Antipolo (PH); Marlon Basa Verdan, Paranaque (PH); Elsbeth Lauren Tagayo Villapana, Las Pinas (PH)

(73) Assignee: BiTMICRO Networks, Inc., Fremont, CA (US)

( * ) Notice: Subject to any disclaimer, the term of this patent is extended or adjusted under 35 U.S.C. 154(b) by 0 days. days.

(21) Appl. No.: 14/217,249

(22) Filed: Mar. 17, 2014

Related U.S. Application Data (60) Provisional application No. 61/799,949, filed on Mar. 15, 2013.

(51) Int. Cl.
   *G06F 3/06* (2006.01)

(52) U.S. Cl.
   CPC .......... *G06F 3/0617* (2013.01); *G06F 3/0656* (2013.01); *G06F 3/0688* (2013.01)

(58) Field of Classification Search
   CPC ..... G06F 3/0617; G06F 3/0656; G06F 3/0688
   See application file for complete search history.

(56) References Cited

U.S. PATENT DOCUMENTS

| | | |
|---|---|---|
| 4,752,871 A | 6/1988 | Sparks |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action dated Sep. 18, 2015 for Taiwanese Patent Application No. 102144165.

(Continued)

*Primary Examiner* — Eric Oberly (57) ABSTRACT

An embodiment of the invention provides a method for optimizing flash device accesses, comprising: interleaving and striping, in tandem, for a transfer of data the other portions of the data.

20 Claims, 4 Drawing Sheets

(56) References Cited

U.S. PATENT DOCUMENTS

| | | | |
|---|---|---|---|
| 5,524,231 A | 6/1996 | Brown | |
| 5,530,828 A | 6/1996 | Kaki et al. | |
| 5,535,328 A | 7/1996 | Harari et al. | |
| 5,535,356 A | 7/1996 | Kim et al. | |
| 5,542,042 A | 7/1996 | Manson | |
| 5,542,082 A | 7/1996 | Solhjell | |
| 5,548,741 A | 8/1996 | Watanabe | |
| 5,559,956 A | 9/1996 | Sukegawa | |
| 5,568,423 A | 10/1996 | Jou et al. | |
| 5,568,439 A | 10/1996 | Harari | |
| 5,572,466 A | 11/1996 | Sukegawa | |
| 5,594,883 A | 1/1997 | Pricer | |
| 5,602,987 A | 2/1997 | Harari et al. | |
| 5,603,001 A | 2/1997 | Sukegawa et al. | |
| 5,606,529 A | 2/1997 | Honma et al. | |
| 5,606,532 A | 2/1997 | Lambrache et al. | |
| 5,619,470 A | 4/1997 | Fukumoto | |
| 5,627,783 A | 5/1997 | Miyauchi | |
| 5,640,349 A | 6/1997 | Kakinuma et al. | |
| 5,644,784 A | 7/1997 | Peek | |
| 5,682,509 A | 10/1997 | Kabenjian | |
| 5,737,742 A | 4/1998 | Achiwa et al. | |
| 5,787,466 A | 7/1998 | Berliner | |
| 5,796,182 A | 8/1998 | Martin | |
| 5,799,200 A | 8/1998 | Brant et al. | |
| 5,802,554 A | 9/1998 | Caceres et al. | |
| 5,819,307 A | 10/1998 | Iwamoto et al. | |
| 5,822,251 A * | 10/1998 | Bruce | G06F 11/1068 365/185.33 |
| 5,875,351 A | 2/1999 | Riley | |
| 5,881,264 A | 3/1999 | Kurosawa | |
| 5,913,215 A | 6/1999 | Rubinstein et al. | |
| 5,918,033 A | 6/1999 | Heeb et al. | |
| 5,930,481 A | 7/1999 | Benhase | |
| 5,943,421 A | 8/1999 | Grabon | |
| 5,956,743 A | 9/1999 | Bruce et al. | |
| 6,000,006 A | 12/1999 | Bruce et al. | |
| 6,014,709 A | 1/2000 | Gulick et al. | |
| 6,076,137 A | 6/2000 | Asnaashari | |
| 6,098,119 A | 8/2000 | Surugucchi et al. | |
| 6,128,303 A | 10/2000 | Bergantino | |
| 6,151,641 A | 11/2000 | Herbert | |
| 6,215,875 B1 | 4/2001 | Nohda | |
| 6,230,269 B1 | 5/2001 | Spies et al. | |
| 6,298,071 B1 | 10/2001 | Taylor et al. | |
| 6,363,441 B1 | 3/2002 | Bentz et al. | |
| 6,363,444 B1 | 3/2002 | Platko et al. | |
| 6,397,267 B1 | 5/2002 | Chong, Jr. | |
| 6,404,772 B1 | 6/2002 | Beach et al. | |
| 6,496,939 B2 | 12/2002 | Portman et al. | |
| 6,526,506 B1 | 2/2003 | Lewis | |
| 6,529,416 B2 | 3/2003 | Bruce et al. | |
| 6,557,095 B1 | 4/2003 | Henstrom | |
| 6,601,126 B1 | 7/2003 | Zaidi et al. | |
| 6,678,754 B1 | 1/2004 | Soulier | |
| 6,744,635 B2 | 6/2004 | Portman et al. | |
| 6,757,845 B2 | 12/2004 | Bruce | |
| 6,857,076 B1 | 2/2005 | Klein | |
| 6,901,499 B2 | 5/2005 | Aasheim et al. | |
| 6,922,391 B1 | 7/2005 | King et al. | |
| 6,961,805 B2 | 11/2005 | Lakhani et al. | |
| 6,970,446 B2 | 11/2005 | Krischer et al. | |
| 6,970,890 B1 | 11/2005 | Bruce et al. | |
| 6,980,795 B1 | 12/2005 | Hermann et al. | |
| 7,103,684 B2 | 9/2006 | Chen et al. | |
| 7,174,438 B2 | 2/2007 | Homma et al. | |
| 7,194,766 B2 | 3/2007 | Noehring et al. | |
| 7,263,006 B2 | 8/2007 | Aritome | |
| 7,283,629 B2 | 10/2007 | Kaler et al. | |
| 7,305,548 B2 | 12/2007 | Pierce et al. | |
| 7,330,954 B2 | 2/2008 | Nangle | |
| 7,372,962 B2 | 5/2008 | Fujimoto et al. | |
| 7,386,662 B1 | 6/2008 | Kekre et al. | |
| 7,412,631 B2 | 8/2008 | Uddenberg et al. | |
| 7,415,549 B2 | 8/2008 | Vemula et al. | |
| 7,424,553 B1 | 9/2008 | Borrelli et al. | |
| 7,430,650 B1 | 9/2008 | Ross | |
| 7,474,926 B1 | 1/2009 | Carr et al. | |
| 7,490,177 B2 | 2/2009 | Kao | |
| 7,500,063 B2 | 3/2009 | Zohar et al. | |
| 7,506,098 B2 | 3/2009 | Arcedera et al. | |
| 7,613,876 B2 | 11/2009 | Bruce et al. | |
| 7,620,748 B1 | 11/2009 | Bruce et al. | |
| 7,624,239 B2 | 11/2009 | Bennett et al. | |
| 7,636,801 B1 | 12/2009 | Kekre et al. | |
| 7,660,941 B2 | 2/2010 | Lee et al. | |
| 7,668,925 B1 | 2/2010 | Liao et al. | |
| 7,676,640 B2 | 3/2010 | Chow | |
| 7,681,188 B1 | 3/2010 | Tirumalai et al. | |
| 7,716,389 B1 | 5/2010 | Bruce et al. | |
| 7,719,287 B2 | 5/2010 | Marks et al. | |
| 7,729,730 B2 | 6/2010 | Orcine et al. | |
| 7,743,202 B2 | 6/2010 | Tsai et al. | |
| 7,765,359 B2 | 7/2010 | Kang et al. | |
| 7,877,639 B2 | 1/2011 | Hoang | |
| 7,913,073 B2 | 3/2011 | Choi | |
| 7,921,237 B1 | 4/2011 | Holland et al. | |
| 7,934,052 B2 | 4/2011 | Prins et al. | |
| 7,958,295 B1 | 6/2011 | Liao et al. | |
| 7,979,614 B1 | 7/2011 | Yang | |
| 8,010,740 B2 | 10/2011 | Arcedera et al. | |
| 8,032,700 B2 | 10/2011 | Bruce et al. | |
| 8,156,279 B2 | 4/2012 | Tanaka et al. | |
| 8,156,320 B2 | 4/2012 | Borras | |
| 8,161,223 B1 | 4/2012 | Chamseddine et al. | |
| 8,165,301 B1 | 4/2012 | Bruce et al. | |
| 8,200,879 B1 | 6/2012 | Falik et al. | |
| 8,219,719 B1 | 7/2012 | Parry et al. | |
| 8,225,022 B2 | 7/2012 | Caulkins | |
| 8,341,311 B1 | 12/2012 | Szewerenko et al. | |
| 8,375,257 B2 | 2/2013 | Hong et al. | |
| 8,447,908 B2 | 5/2013 | Bruce et al. | |
| 8,510,631 B2 | 8/2013 | Wu et al. | |
| 8,560,804 B2 | 10/2013 | Bruce et al. | |
| 8,707,134 B2 | 4/2014 | Takahashi et al. | |
| 8,713,417 B2 | 4/2014 | Jo | |
| 8,762,609 B1 | 6/2014 | Lam et al. | |
| 8,788,725 B2 | 7/2014 | Bruce et al. | |
| 8,832,371 B2 | 9/2014 | Uehara et al. | |
| 8,856,392 B2 | 10/2014 | Myrah et al. | |
| 8,959,307 B1 | 2/2015 | Bruce et al. | |
| 9,043,669 B1 | 5/2015 | Bruce et al. | |
| 9,099,187 B2 | 8/2015 | Bruce et al. | |
| 9,135,190 B1 | 9/2015 | Bruce et al. | |
| 9,147,500 B2 | 9/2015 | Kim et al. | |
| 2001/0010066 A1 | 7/2001 | Chin et al. | |
| 2002/0044486 A1 | 4/2002 | Chan et al. | |
| 2002/0073324 A1 | 6/2002 | Hsu et al. | |
| 2002/0083262 A1 | 6/2002 | Fukuzumi | |
| 2002/0083264 A1 | 6/2002 | Coulson | |
| 2002/0141244 A1 | 10/2002 | Bruce et al. | |
| 2003/0023817 A1 | 1/2003 | Rowlands et al. | |
| 2003/0065836 A1 | 4/2003 | Pecone | |
| 2003/0120864 A1 | 6/2003 | Lee et al. | |
| 2003/0126451 A1 | 7/2003 | Gorobets | |
| 2003/0131201 A1 | 7/2003 | Khare et al. | |
| 2003/0161355 A1 | 8/2003 | Falcomato et al. | |
| 2003/0163624 A1 | 8/2003 | Matsui et al. | |
| 2003/0163647 A1 | 8/2003 | Cameron et al. | |
| 2003/0163649 A1 | 8/2003 | Kapur et al. | |
| 2003/0182576 A1 | 9/2003 | Morlang et al. | |
| 2003/0188100 A1 | 10/2003 | Solomon et al. | |
| 2003/0204675 A1 | 10/2003 | Dover et al. | |
| 2003/0217202 A1 | 11/2003 | Eugene Zilbemian et al. | |
| 2003/0223585 A1 | 12/2003 | Tardo et al. | |
| 2004/0073721 A1 | 4/2004 | Goff et al. | |
| 2004/0128553 A1 | 7/2004 | Buer et al. | |
| 2005/0050245 A1 | 3/2005 | Miller et al. | |
| 2005/0078016 A1 | 4/2005 | Neff | |
| 2005/0097368 A1 | 5/2005 | Peinado et al. | |
| 2005/0120146 A1 | 6/2005 | Chen et al. | |
| 2005/0210149 A1 | 9/2005 | Kimball | |
| 2005/0210159 A1 | 9/2005 | Voorhees et al. | |
| 2005/0226407 A1 | 10/2005 | Kasuya et al. | |

(56) References Cited

U.S. PATENT DOCUMENTS

| | | |
|---|---|---|
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0031450 A1 | 2/2006 | Unrau et al. |
| 2006/0039406 A1 | 2/2006 | Day et al. |
| 2006/0095709 A1 | 5/2006 | Achiwa |
| 2006/0112251 A1 | 5/2006 | Karr et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0052456 A1 | 2/2008 | Ash et al. |
| 2008/0072031 A1 | 3/2008 | Choi |
| 2008/0104264 A1 | 5/2008 | Duerk et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1* | 7/2009 | Prins .................. G06F 13/1657 711/103 |
| 2009/0172466 A1 | 7/2009 | Royer et al. |
| 2009/0240873 A1* | 9/2009 | Yu ........................ G06F 3/0608 711/103 |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0197011 A1 | 8/2011 | Suzuki et al. |
| 2011/0202709 A1 | 8/2011 | Rychlik |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0161568 A1 | 6/2012 | Umemoto et al. |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pmeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1* | 10/2013 | Jokinen .................. G06F 13/28 710/22 |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action dated Sep. 29, 2015 for U.S. Appl. No. 14/217,316.
Office Action dated Sep. 28, 2015 for U.S. Appl. No. 14/689,045.
Office Action for U.S. Appl. No. 13/475,878, dated Jun. 23, 2014.
Office Action for U.S. Appl. No. 13/253,912, dated Jul. 16, 2014.
Office Action for U.S. Appl. No. 12/876,113, dated Jul. 11, 2014.
Office Action for U.S. Appl. No. 12/270,626, dated Feb. 3, 2012.
Office Action for U.S. Appl. No. 12/270,626, dated Apr. 4, 2011.
Office Action for U.S. Appl. No. 12/270,626, dated Mar. 15, 2013.

(56) References Cited

OTHER PUBLICATIONS

Notice of Allowance/Allowability for U.S. Appl. No. 12/270,626, dated Oct. 3, 2014.
Advisory Action for U.S. Appl. No. 12/876,113, dated Oct. 16, 2014.
Office Action for U.S. Appl. No. 14/297,628, dated Jul. 17, 2015.
Office Action for U.S. Appl. No. 13/475,878, dated Dec. 4, 2014.
Office Action for U.S. Appl. No. 12/876,113, dated Mar. 13, 2014.
Advisory Action for U.S. Appl. No. 12/876,113, dated Sep. 6, 2013.
Office Action for U.S. Appl. No. 12/876,113, dated May 14, 2013.
Office Action for U.S. Appl. No. 12/876,113, dated Dec. 21, 2012.
Security Comes to Snmp: The New SNMPv3 Proposed Internet Standard, The Internet Protocol Journal, vol. 1, No. 3, Dec. 1998.
Notice of Allowability for U.S. Appl. No. 12/882,059, dated May 30, 2013.
Notice of Allowability for U.S. Appl. No. 12/882,059, dated Feb. 14, 2013.
Office Action for U.S. Appl. No. 12/882,059, dated May 11, 2012.
Notice of Allowability for U.S. Appl. No. 14/038,684, dated Aug. 1, 2014.
Office Action for U.S. Appl. No. 14/038,684, dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/616,700 dated Apr. 30, 2015.
Office Action for U.S. Appl. No. 14/215,414 dated Jun. 4, 2015.
Office Action for U.S. Appl. No. 14/217,467 dated Apr. 27, 2015.
Office Action for U.S. Appl. No. 14/217,436 dated Sep. 11, 2015.
Office Action for U.S. Appl. No. 13/253,912 dated Jul. 16, 2014.
Office Action for U.S. Appl. No. 13/475,878 dated Jun. 23, 2014.
Office Action for U.S. Appl. No. 12/876,113 dated Jul. 11, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Apr. 4, 2011.
Office Action for U.S. Appl. No. 12/270,626 dated Dec. 18, 2013.
Office Action for U.S. Appl. No. 12/270,626 dated Mar. 15, 2013.
Office Action for U.S. Appl. No. 12/270,626 dated Aug. 23, 2012.
Office Action dated Sep. 11, 2015 for U.S. Appl. No. 14/217,436.
Office Action dated Sep. 24, 2015 for U.S. Appl. No. 14/217,334.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action dated Dec. 5, 2014 for U.S. Appl. No. 14/038,684.
Office Action dated Oct. 8, 2015 for U.S. Appl. No. 14/217,291.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution, http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Advisory Action for U.S. Appl. No. 14/217,334 dated Jun. 13, 2016.
Office Action for U.S. Appl. No. 14/217,291 dated Jun. 15, 2016.
Notice of allowance/allowability for U.S. Appl. No. 14/217,365 dated Oct. 18, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 14/217,161 dated Jun. 14, 2016.
Office Action for U.S. Appl. No. 14/689,045 dated Jun. 27, 2016.
Office Action for U.S. Appl. No. 14/217,096 dated Jul. 12, 2016.
Notice of Allowance for U.S. Appl. No. 14/217,399 dated Jul. 20, 2016.
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Office Action for U.S. Appl. No. 14/216,937 dated Aug. 15, 2016.
Working Draft American National Standard Project T10/1601-D Information Technology Serial Attached SCSI—1.1 (SAS—1.1), Mar. 13, 2004 Revision 4.
Notice of allowance/allowability for U.S. Appl. No. 14/217,467 dated Apr. 20, 2016.

* cited by examiner

SCATTER-GATHER APPROACH FOR PARALLEL DATA TRANSFER IN A MASS STORAGE SYSTEM

CROSS-REFERENCE(S) TO RELATED APPLICATIONS

This application claims the benefit of and priority to U.S. Provisional Application 61/799,949 filed 15 Mar. 2013. This U.S. Provisional Application 61/799,949 is hereby fully incorporated herein by reference.

FIELD

Embodiments of the invention relate to storage systems. More particularly, the present invention relates to the method of implementing a faster data transfer in a mass storage system.

DESCRIPTION OF RELATED ART

Write data transfers in a conventional storage system are realized by two main operations, i.e. a data transfer from the host device to the system cache followed by the data transfer from the cache to a specific storage device. Similarly, a read transfer would entail that data retrieved from the storage device is primarily transferred to the system cache, after which data is forwarded to the host device. A common problem with this approach arises when large amount of data needs to be transferred by the system to non-volatile storage devices. Limitations on current technology allow programming or reading of data to/from storage devices to be only so fast. System performance, consequently, is tied to the slow mechanical storage devices. Subsequent requests from the host cannot be serviced by the system until the data transfer currently in service is completed. Thus, a primary concern for storage systems is to device certain methodologies that would allow the system to transfer subject data with minimal latency in spite of limitations on storage mediums.

A link between a computer system and other devices, such as flash devices, is generally called a channel. A channel is an independent unit and can function separately from the other channels coupled to the computer system and is capable of controlling data transfers on its assigned memory address space. Consequently, the computer system can initiate concurrent data transfers across different memory address spaces through the different channels coupled to it. Interleaving pertains to the method of accessing data in a parallel fashion by means of multiple channels. Striping means that data is divided into chunks of a certain size to be distributed to the devices across the storage array. The first stripe of data is sent to the first device, then the second stripe to the second device, and so on. The storage array has two critical parameters that have an important impact on the performance of the striped data in the storage array. The first key parameter is the stripe width of the storage array. Stripe width refers to the number of parallel stripes that can be written to or read from the storage array simultaneously. The second important parameter is the stripe size of the storage array, sometimes also referred to by the terms such as block size, chunk size, stripe length or granularity. This term refers to the size of the stripes written to each device.

SUMMARY

An embodiment of the present invention is directed to the system performance limitation brought about by the slow storage devices. There is a need to make use of the benefits of striping and memory interleaving in improving the architecture of existing mass-storage systems in order to improve system performance.

An embodiment of the present invention provides a method that allows faster data transfer to and from an array of storage devices. Employing the concepts of data striping and interleaving to achieve parallel data transfer significantly reduces memory latency. The entire storage array appears to the host device as a single storage device. Thus transfers employing the methods presented by the present invention appear to the host as the same as a conventional data transfer that was executed in significantly less time.

The architecture of a scalable mass storage system comprises an I/O interface, a system bus, a local processor, a system cache, a plurality of DMA controllers coupled to a plurality of solid-state non-volatile memory devices. This achieves the concurrent data transfer across the storage array further reducing memory latency.

For Write to flash operations, data is divided into several portions called stripes. The local processor assigns a flash device address for each data stripe. A plurality of DMA engines are provided in each DMA controller. One or more engines across the system are issued with an instruction to control the transfer of a specific data stripe from the cache to the corresponding flash device. DMA engines work independently and the transfer of each corresponding data stripe is executed concurrently. A DMA engine is not tied to any specific memory address, and thus can be initiated to access any memory location in the cache. A data stripe is initially set aside in the DMA controller's data buffer. A write to flash operation is initiated by the DMA engine through the flash buffer chip. A high speed bus is provided to couple the flash buffer chip to the DMA engines. The flash buffer chip is used to forward flash specific command, address and raw data bytes from the DMA controller to the corresponding flash device. Data stripe in the DMA controller's data buffer is forwarded to the flash buffer chip via the high speed bus. The high speed bus supports burst transfers. A flash memory bus is provided to permit linking of multiple flash devices to the flash buffer chip. The flash buffer chip transmits data bytes over the flash memory bus. An internal buffer is provided in the flash buffer chip to facilitate the transmission of data bytes over the flash memory bus.

Alternatively, a Read from Flash command issued by the system host will result in the DMA engines receiving an instruction to retrieve a specific data stripe from the storage array. A DMA engine will initiate a read operation from the corresponding flash device through a flash buffer chip. Data stripe retrieved from the flash devices are transmitted over the flash memory bus and buffered by the flash buffer chip. The flash buffer chip forwards the data in its buffer to the DMA controller via a high speed bus. Lastly, the DMA engine forwards data stripe in the DMA controller's data buffer to the cache. With each DMA engine performing its corresponding data transfer for assigned data stripes, original data is reconstructed in the cache. The I/O interface, in turn, is in charge of the transfer of the reconstructed data in the cache to the requesting system host.

Several methods are provided to achieve concurrent data transfers:

1) Scatter-Gather Approach through Device Striping: Interleaving is accomplished with the use of one or more engines in a single DMA controller. Striping of data is executed across several flash devices belonging to a single flash module and accessed through a single high speed bus.

2) Scatter-Gather Approach through Group Striping: Interleaving is accomplished with the use of one or more engines in a single DMA controller. Striping of data is executed across several flash devices belonging to different flash modules and accessed through a single high speed bus.

3) Scatter-Gather Approach through Bus Striping: Interleaving is accomplished with the use of several engines which may belong to one or more DMA controllers. Striping of data is executed across several flash devices belonging to different flash modules and accessed through several high speed busses.

Execution of one or a combination of the above mentioned approaches lends versatility and improved performance to the system.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An embodiment of the present invention relates to a method of transferring large blocks of data through a scatter-gather approach. The term "scatter" pertains to the distribution of the whole data to the entire mass storage system to virtually any flash device in the storage system. Likewise, the term "gather" relate to the fact that each small piece of data scattered throughout the storage system is retrieved to reconstruct the original data in the cache. The concepts of striping and interleaving are utilized to achieve the scatter-gather approach for the data transfer. The current invention achieves a parallel transfer of data by optimizing the architecture of the non-volatile storage system.

In an embodiment of the invention, in order to optimize flash device accesses, interleaving and striping methods are used in tandem. This method is implemented with the usage of multiple DMA engines. Each engine works independently from other DMA engines performing the transfer of the other portions of the data. The amount of time to transfer data is minimized by as much as the number of DMA engines used. Additional features include flexibility in reconfiguring stripe size and the number of interleaves depending on the user's application. An embodiment of the invention also provides a method for optimizing flash device accesses, comprising: interleaving and striping, in tandem, for a transfer of data the other portions of the data.

The figures and discussions provided in this document are meant to illustrate the invention being presented. It should not be construed as the only architecture to which the present invention can be utilized. The concepts and methods presented in this invention can be employed to other architectures in order to achieve a parallel data transfer that would enhance system performance.

Figure 1:
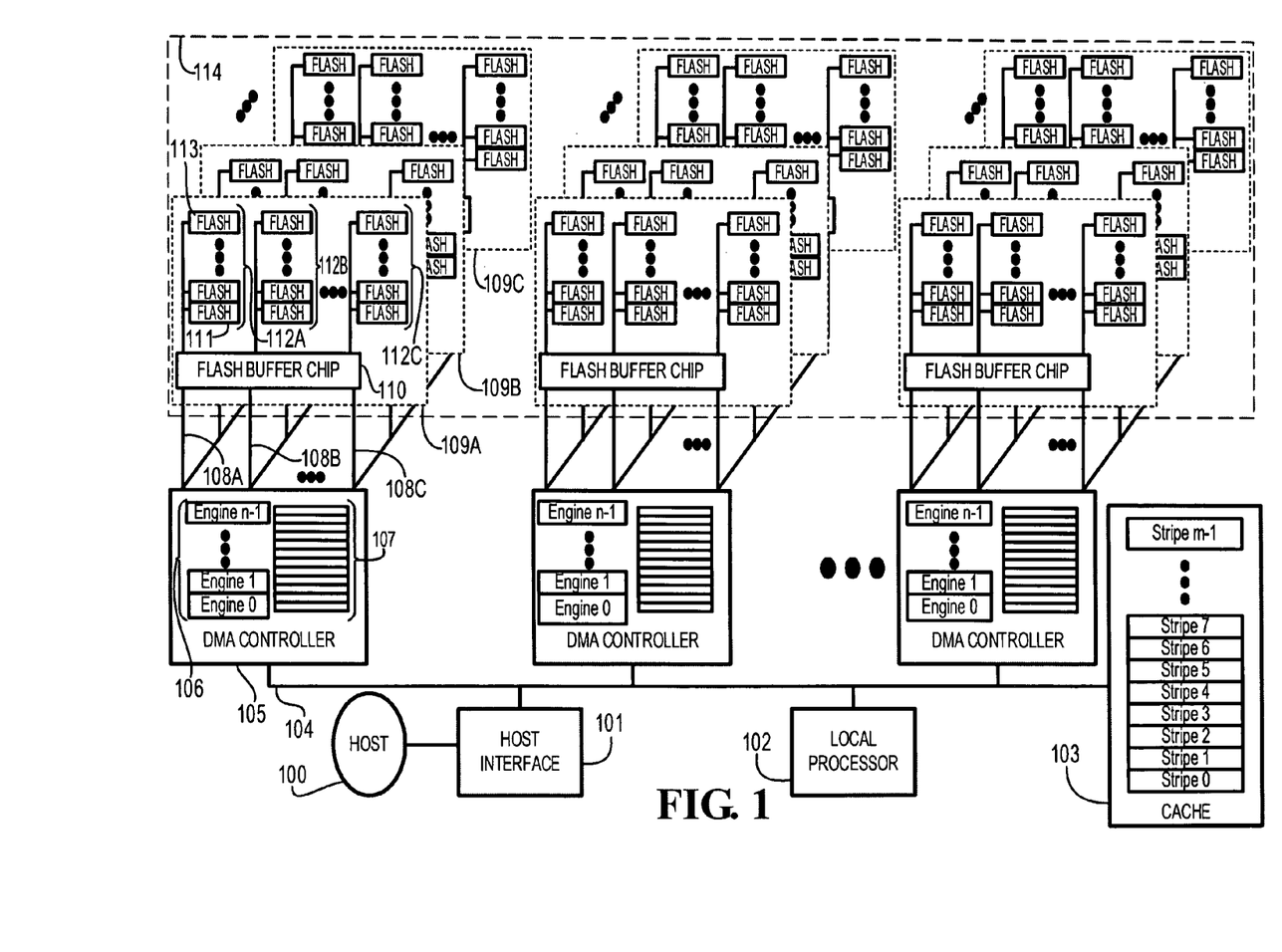
FIG. 1 is a block diagram illustrating an embodiment of a scalable mass storage system in accordance with the present invention.

A mass storage system of solid state non-volatile devices is illustrated in FIG. 1. Request for a data transfer is issued by an external host 100, received by an internal host interface 101 and forwarded to the local processor 102 through a local bus 104. High-level requests are generated by the local processor 102 and issued to a DMA controller 105. The DMA controller 105 handles the data transfer without any further intervention from the local processor 102.

In the case of write data transfers, the DMA controller 105 fetches data from the volatile memory device (cache) 103 and transfer it to one of the solid state non-volatile memory device (flash device) 113. A flash bank 112A comprises a plurality of flash devices connected to a flash buffer chip 110 through a single flash memory bus 111. A flash module 109A comprises a flash buffer chip 110 and a plurality of flash banks 112A-112C. Data is forwarded by the flash buffer chip 110 to a flash device 113 through the flash memory bus 111. Each flash module 109A-109C can be implemented in a single die/package. A plurality of flash modules 109A-109C is coupled to the DMA controller 105. The flash buffer chip of each flash module 109A-109C is coupled to the DMA controller 105 through the high speed busses 108A-108C.

Each high speed bus coupled to the DMA controller 105 corresponds to one of the flash banks 112A-112C which are all coupled to the flash buffer chip 110. An internal buffer (not shown) is provided in the flash buffer chip 110 as a temporary holding area for data transmitted over the high speed busses 108A-108C. More details on exemplary implementation of the high speed busses 108A-108C and the internal buffers provided in each flash buffer chip can be found in U.S. patent application Ser. No. 12/876,247, issued on 21 May 2013 as U.S. Pat. No. 8,447,908.

The present invention presents several options that could be implemented to enhance data transfer rates. Implementing one or a combination of presented options in a manner that suits the application will minimize required transfer time, allowing the system to overcome limiting factors brought about by the slow flash devices.

In one preferred embodiment of the present invention, data from the system host 100 that has been temporarily stored in the system cache 103 is divided into several portions and is transferred to the storage array 114 concurrently. The granularity of data portion could be any stripe size from 1 byte, 2 bytes to n-bytes. The transfer of each portion or stripe of data can be initiated by a command issued by the local processor 102 to the assigned DMA controller. The command received by the DMA controller 105 indicates the type of the operation and the addresses for the operation to occur. The operation may be a read or a write transfer while the address indicates the source and destination addresses of data to be transferred. The source address for write operations corresponds to the address in the cache 103 where the data stripe will be fetched by the DMA controller 105. The destination address, on the other hand, corresponds to the page address of a certain flash device 113 where the data will be written to. Similarly, the source address for read operations pertain to the page address in the flash device 113 where the data will be retrieved, and the destination address points to the cache 103 address where data will be transferred to. Taking into account the command overhead involved for each data transfer, the granularity of data should be chosen appropriately to provide an optimum system performance.

A DMA controller 105 comprises a plurality of engines 106. Each engine in the DMA controller 105 works independently. The engines 106 facilitate the concurrent operations across the flash banks 112A-112C of each flash module 109A-109C coupled to the DMA controller 105 over the high speed busses 108A-108C. Since each engine works independently, execution of the instructions issued by the local processor 102 for each engine does not follow an exact sequence. That is, any engine could initiate the first transfer of data from the cache 103 to the corresponding flash device in the storage array 114. A data buffer 107 is provided for each DMA controller 105. The data buffer 107 is shared by all engines 106 in the DMA controller 105. The data buffer 107 is utilized by the engines 106 for the data transfers between the non-volatile 113 and volatile 103 memory devices. As soon as an engine receives a Write to Flash command from the local processor 102, it transfers the data from the volatile memory device 103 to the DMA controller's data buffer 107. This way, when the corresponding data transfer to the non-volatile memory device 113 is initiated by the DMA controller 105, data can be readily transferred over the high speed bus 108A or 108B or 108C. Likewise, upon receiving a Read from Flash command from the local processor 102, data retrieved from the addressed flash device 113 is buffered in the DMA controller's data buffer 107 from where data will be forwarded to the system cache 103.

(Discussion of data mapping over the storage array and the corresponding request generation is presented in greater detail in U.S. Pat. No. 7,506,098).

(Discussion of the command queueing for the engines is presented in greater detail in publications available to those skilled in the art).

(Discussion of the handshaking between the DMA controller and flash buffer chips over the Flashbus™ is presented in greater detail in U.S. Pat. No. 7,506,098).

Scatter-Gather Approach Through Device Striping

Figure 2:
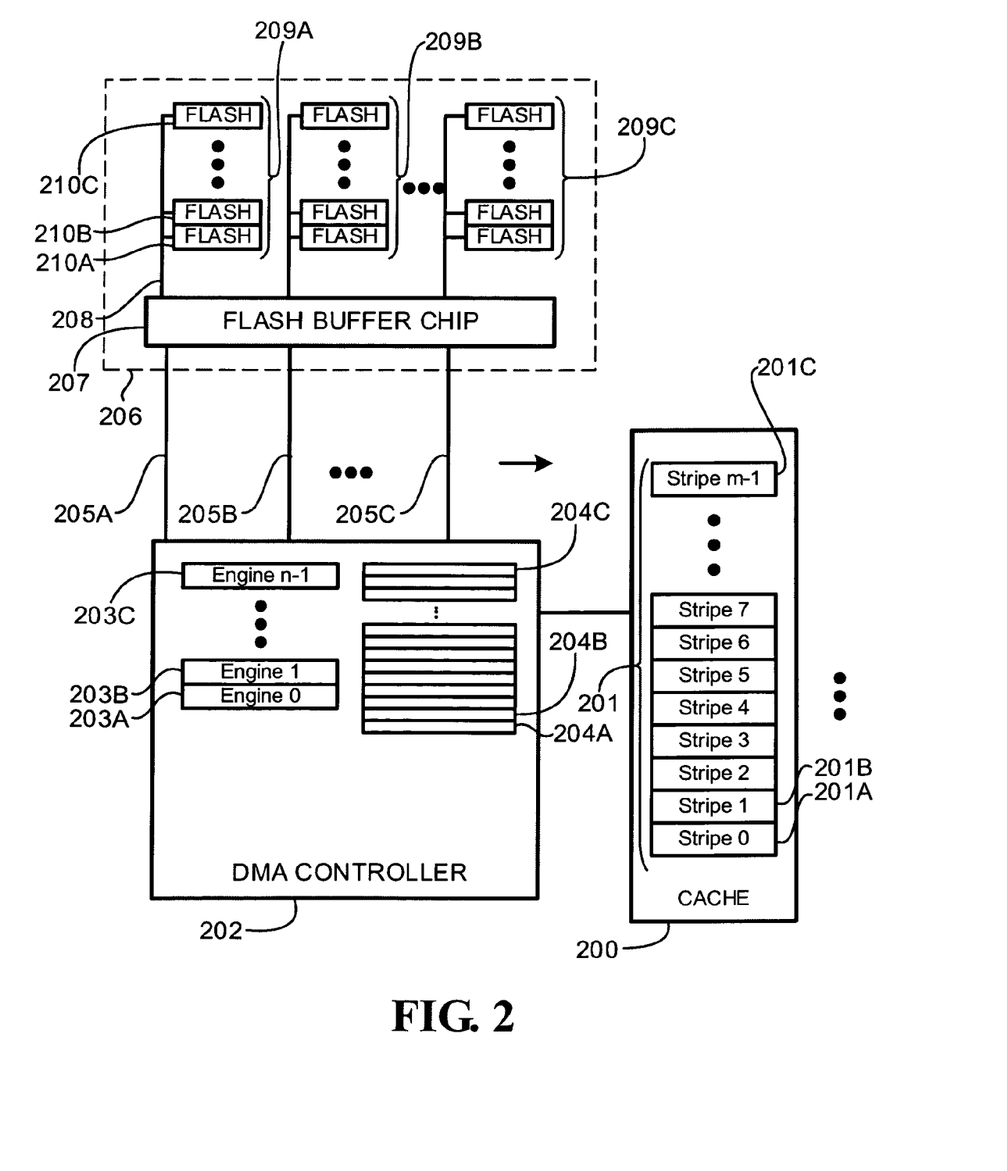
FIG. 2 is a block diagram illustrating a parallel data transfer across a plurality of flash devices in a flash bank in accordance with the present invention.

A device striping approach for a write data transfer is illustrated in FIG. 2, wherein the data transfer involves a single DMA controller 202 and a single flash bank 209A.

For a Write to Flash transfer, data 201 in the cache 200 is broken into m portions. Each data portion or stripe 201A-201C will be transferred across the flash devices 210A-210C of flash bank 209A in flash module 206. The local processor will issue an instruction to each of the n engines 203A-203C in the DMA controller 202 to control the transfer of each portion of data 201A-201C from the cache 200. Engine 203A will get an instruction from the local processor to transfer data stripe 201A to flash device 210A; engine 203B will receive an instruction to transfer data stripe 201B to flash device 210B, and so on. If the data 201 is divided into portions which exactly match the number of engines in the DMA controller 202, that is m=n, then each engine 203A-203C will have exactly one data stripe to transfer. Otherwise, if the data 201 is split into several portions wherein the number of data stripes is greater than the number of engines, that is m>n, the local processor will assign the first n stripes to engines 203A-203C. The assignment for the remaining stripes will again start from engine 203A and so on until transfer for all stripes are delegated to a specific DMA engine. That is to say, transfer of data stripe n+1 will be assigned to engine 203A, data stripe n+2 to engine 203B and so on until data stripe m is assigned to a specific DMA engine. Furthermore, it is also possible that the number of flash devices in the flash bank 209A is not enough to accommodate all the m data. In which case, the local processor will assign the first x data stripes, wherein x is the number of flash devices in a flash bank, across all flash devices 210A-210C in the flash bank 209A, and then re-assign the succeeding data stripes x+1 to a different page across all flash devices 210A-210C of the same flash bank 209A, and so on until all m data stripes have been assigned to a specific flash device.

Upon receiving the Write to Flash request from the local processor, engine 203A will fetch data stripe 201A from the cache 200 and transfer it to buffer location 204A of the DMA controller 202. As soon as data stripe 201A is in buffer location 204A, engine 203B in turn, initiates the transfer of data stripe 201B from the cache 200 to buffer location 204B. Each engine 203A-203C alternately transfer assigned data stripe from the cache 200 to the data buffer of the DMA controller 202 until all data stripes have been fetched from the cache 200.

During the course of the transfer of the data stripes from the cache 200 to the DMA controller data buffer 204, another set of data transfer is taking place in the high speed bus 205A. Once data stripe 201A is in buffer location 204A, engine 203A will instruct the flash buffer chip 207 to initiate the write operation for flash device 210A. In this phase, engine 203A likewise forwards data stripe 201A, from buffer location 204A to the flash buffer chip 207 internal buffer (not shown) through the high speed bus 205A in preparation for the pending write operation to flash device 210A. Once the flash buffer chip 207 has sent to the flash device 210A the appropriate flash command and the corresponding flash address, it will start the transmission of data stripe 201A, which is currently residing in the internal buffer, to flash device 210A over the flash memory bus 208.

Likewise, engine 203B will initiate the transfer of data stripe 201B over to flash device 210B. The transfer of data stripe 201B from buffer location 204B in the DMA controller 202 to the flash buffer chip 207 occurs in parallel to the programming of data stripe 201A to flash device 210A. The process above repeats until all data stripes that comprise the entire data 201 has been distributed over the flash devices 210A-210C of flash module 206 as designated by the local processor.

In a similar fashion, a Read from Flash request from the external host device for the data 201 will result to the local processor generating instructions for each engine 203A-203C in the DMA controller 202 to retrieve each corresponding data stripe 201A-201C from flash devices 210A-210C. To illustrate, engine 203A will trigger flash buffer chip 207 to initiate a read operation for flash device 210A to retrieve data stripe 201A. While flash device 210A is busy acquiring and relocating data stripe 201A from its storage array to the device's data register, engine 203B triggers flash buffer chip 207 to initiate the read operation for flash device 210B to retrieve data stripe 201B. All other engines, will likewise initiate the read operation for each corresponding flash device to retrieve all data stripes. Once requested data is already residing in the internal buffer of the flash buffer chip 207, the corresponding engine will initiate the transfer of the data from the flash buffer chip 207 to a free buffer location in the data buffer 204. That is to say, engine 203A will request flash buffer chip 207 to forward data in its internal buffer that corresponds to data stripe 201A over the high speed bus 205A. Data stripe 201A transmitted over the high speed bus 205A will be kept in the data buffer location 204A. Engine 203A will then forward acquired data stripe 201A from buffer location 204A to the cache 200. Correspondingly, each engine 203B-203C will forward subsequent data stripes 201B-201C from flash devices 210B-210C to the cache 200. This results to the reconstruction of the original data 201 in the cache 200.

As mentioned before, the execution of the instructions issued by the local processor for each engine does not follow an exact order, thus the sequence of data transfer is not restricted to the discussion provided above. Engine 203C could initiate the transfer for data stripe 201C from the cache 200 to the DMA controller data buffer 204 before engine 203A sets off the transfer of data stripe 201A. Data transfer for any data stripe 201A-201C from the cache 200, for that matter, could be executed first by the corresponding engine 203A-203C. Furthermore, as implied by the term "scatter", the data stripe assignment of each DMA controller, and consequently of each flash device, does not necessarily have to be sequential as illustrated in the discussion. Data stripe 201A could be programmed to flash device 210C instead, while data stripe 201B is programmed to flash device 210A, whereas data stripe 201C is programmed into flash device 210B.

Moreover, the device striping mechanism can be executed to other flash banks 209B-209C, and is not limited to the first flash bank 209A of flash module 206. If the local processor opts to distribute the data 201 over flash bank 209B, high speed bus 205B will be used for the transfer between the DMA controller 202 and the flash buffer chip 207. Likewise, device striping with flash bank 209C will entail the use of the high speed bus 205C.

Scatter-Gather Approach Through Group Striping

Figure 3:
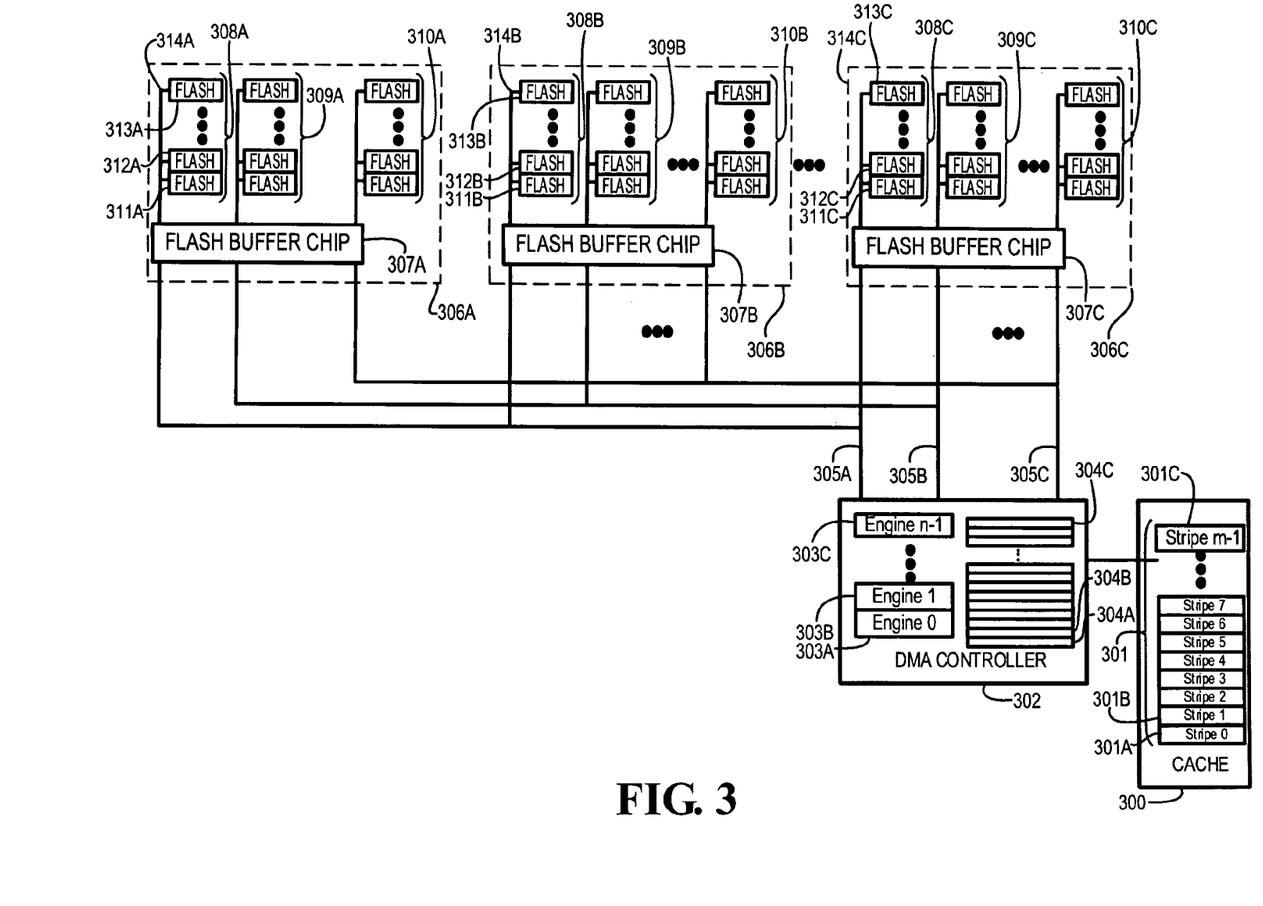
FIG. 3 is a block diagram illustrating a parallel data transfer across a plurality of flash devices belonging to different flash modules coupled through a single high speed bus in accordance with the present invention.

The parallel data transfer offered by the device striping transfer is further enhanced by the group striping method. The group striping approach involves data transfer across flash banks 308A-308C, each flash bank belonging to flash module 306A-306C respectively and connected through a single high speed bus 305A, as shown in FIG. 3.

For a Write to Flash data transfer, data 301 in the cache 300 is broken into m portions. Each data stripe 301A-301C will be transferred across the flash banks 308A-308C coupled to the DMA controller 302 through the high speed bus 305A. The local processor will issue an instruction for each engine 303A-303C in the DMA controller 302 to transfer one portion of the data 301 from the cache 300. Engine 303A will receive an instruction from the local processor to transfer data stripe 301A to flash device 311A of flash bank 308A, engine 303B will be designated to transfer data stripe 301B to flash device 311B of flash bank 308B, and so on.

Upon receiving the Write to Flash request from the local processor, engine 303A will fetch data stripe 301A from the cache 300 and transfer it to buffer location 304A. As soon as data stripe 301A is in buffer location 304A, engine 303B in turn initiates the transfer of data stripe 301B from cache 300 to buffer location 304B. Each engine 303A-303C alternately transfer assigned data stripe from the cache 300 to the data buffer of the DMA controller 302 until all data stripes have been fetched from the cache 300.

While each data stripe from the cache 300 is being transferred to the DMA controller data buffer, another set of data transfer is taking place over the high speed bus 305A. In the instance that data stripe 301A is in buffer location 304A, engine 303A will instruct flash buffer chip 307A to initiate the write operation for flash device 311A. In this phase, engine 303A likewise forwards data stripe 301A, from buffer location 304A to the internal buffer (not shown) of flash buffer chip 307A, through the high speed bus 305A, in preparation for the pending write operation to flash device 311A. As soon as data stripe 301A is transferred to flash buffer chip 307A, engine 303A releases ownership of the high speed bus 305A as engine 303B takes over the high speed bus 305A. In the same way, engine 303B will initiate the write operation for flash device 311B through flash buffer chip 307B. Data stripe 301B will be forwarded from buffer location 304B to the internal buffer of flash buffer chip 307B. Similarly, engine 303C transfers data stripe 301C to the internal buffer of flash buffer chip 307C once it gains control of the high speed bus 305A. Each engine replicates the process discussed in order to transfer each engine's corresponding data stripe to the designated flash device.

Flash buffer chip 307A, having initiated the write operation for flash device 311A, will transmit data stripe 301A from its internal data buffer over the flash memory bus 314A. Flash buffer chip 307B, as well, will transmit data stripe 301B to flash device 311B over the flash memory bus 314B once data stripe 301B is transferred to its internal buffer. All flash buffer chips involved in the data transfer will go through the same process. Thus, flash buffer chip 307C will likewise transfer data stripe 301C to flash device 311C through flash memory bus 314C.

Data transfer from the flash buffer chips 307A-307C to the corresponding flash devices 311A-311C is executed in parallel since different flash buffer chips and consequently different flash memory busses are utilized.

In a similar fashion, a Read from Flash request for the data 301 will result to the local processor generating instructions for each engine 303A-303C in the DMA controller 302 to retrieve each corresponding data stripe 301A-301C from flash devices 311A-311C. Engine 303A will initiate a read operation for flash device 311A to retrieve data stripe 301A, through flash buffer chip 307A. At the same time, engine 303B instructs flash buffer chip 307B to initiate the read operation for flash device 311B to retrieve data stripe 301B. All other engines, will likewise initiate the read operation for each corresponding flash device to retrieve all related data stripes. Once requested data is already residing in the internal buffer of the flash buffer chip, the corresponding engine will initiate the transfer of the data from the flash buffer chip to a free buffer location in the DMA controller's 302 data buffer. Specifically, engine 303A will request flash buffer chip 307A to forward the data in its internal buffer which corresponds to data stripe 301A. Data stripe 301A transmitted over high speed bus 305A will be kept in buffer location 304A, from which location engine 303A will forward acquired data stripe 301A to the cache 300. Similarly, each engine 303B-303C will forward subsequent data stripes from flash buffer chips 307B-307C to the cache 300. This results to the reconstruction of the original data 301 in the cache 300. It is important to note, however, that the cache address where the data 301 will be reconstructed does not necessarily have to be the same cache address used during the write operation.

It should also be noted that the group striping approach is not limited to the use of the first flash device 311A-311C of each flash bank 308A-308C as what is presented in the discussion above. The local processor can choose any flash device from 311A-311C, 312A-312C to 313A-313C from each flash bank 308A-308C as the end destination for the data stripes. Correspondingly, the engines, acting based on the instructions from the local processor, will transfer their designated data stripe from the cache to the assigned flash device. That is to say that the Write to Flash or Read from Flash data transfers discussed above could have involved 312A-312C or even 313A-313C. Moreover, the group striping approach, as discussed above could be executed utilizing other flash banks of flash modules 306A-306C, such as flash banks 309A-309C or 310A-310C. Group striping method involving flash banks 309A-309C would entail the use of the high speed bus 305B, as it is with flash banks 310A-310C utilizing high speed bus 305C. Furthermore, the local processor can incorporate the device striping concept with the group striping approach as described in the succeeding discussions.

For Write to Flash data transfers, data 301 in the cache 300 is broken into m portions. Each data stripe 301A-301C will be transferred across the flash banks 308A-308C coupled to the DMA controller 302 through the high speed bus 305A. The local processor will issue an instruction for each engine 303A-303C in the DMA controller 302 to transfer one portion of data 301 from the cache 300. Engine 303A will receive an instruction from the local processor to transfer data stripe 301A to flash device 311A of flash bank 308A, engine 303B will be designated to transfer data stripe 301B to flash device 312B of flash bank 308B, and so on; engine 303C will transfer data stripe 301C to flash device 313C of flash bank 308C.

Upon receiving the Write to Flash request from the local processor, engine 303A will fetch data stripe 301A from the cache 300 and transfer it to buffer location 304A of the DMA controller data buffer. As soon as data stripe 301A is in buffer location 304A, engine 303B in turn initiates the transfer of data stripe 301B from cache 300 to buffer location 304B. Each engine 303A-303C alternately transfer assigned data stripe from the cache 300 to the data buffer of the DMA controller 302 until all data stripes have been fetched from the cache 300.

While each data stripe from the cache 300 is being transferred to the DMA controller data buffer, another set of data transfer is taking place in the high speed bus 305A. In the instance that data stripe 301A is in buffer location 304A, engine 303A will instruct flash buffer chip 307A to initiate the write operation for flash device 311A. In this phase, engine 303A likewise forwards data stripe 301A, from buffer location 304A to the internal buffer of flash buffer chip 307A, through the high speed bus 305A, in preparation for the pending write operation to flash device 311A. As soon as data stripe 301A is transferred to flash buffer chip 307A, engine 303A releases ownership of the high speed bus 305A as engine 303B takes over the high speed bus 305A. In the same way, engine 303B will initiate the write operation for flash device 312B through flash buffer chip 307B. Data stripe 301B will be forwarded from buffer location 304B to the internal buffer of flash buffer chip 307B. Similarly, engine 303C transfers data stripe 301C to the internal buffer of flash buffer chip 307C once it gains control of the high speed bus 305A. Each engine will replicate the process discussed above to transfer each engine's corresponding data stripe to the designated flash device.

Flash buffer chip 307A, having initiated the write operation for flash device 311A, will transmit data stripe 301A over the flash memory bus 314A. Flash buffer chip 307B, on the other hand, will transmit data stripe 301B to flash device 312B over the flash memory bus 314B once data stripe 301B is transferred to its internal buffer. All flash buffer chips involved in the data transfer will go through the same process discussed. Thus, flash buffer chip 307C will likewise transfer data stripe 301C to flash device 313C through flash memory bus 314C.

Data transfer from the flash buffer chips 307A-307C to the corresponding flash devices 311A, 312B to 313C is likewise executed in parallel. The latter discussion illustrates that the chosen end destination for each data stripe need not be the same flash device of each flash module. That is, in flash module 306A the first flash device 311A in the flash bank is chosen as the end destination for a particular data stripe, while in flash module 306B flash device 312B, the second flash device in the flash bank, is selected as the end destination for the corresponding data stripe and so on.

In a similar fashion, a Read from Flash request for the data 301 will result to the local processor generating instructions for each engine 303A-303C in the DMA controller 302 to retrieve each corresponding data stripe 301A-301C from flash devices 311A, 312B to 313C. Engine 303A will initiate a read operation for flash device 311A to retrieve data stripe 301A. At the same time, engine 303B initiates the read operation for flash device 312B to retrieve data stripe 301B. All other engines, will likewise initiate the read operation for each corresponding flash device to retrieve all related data stripes. Once requested data is already residing in the internal buffer of the flash buffer chip, the corresponding engine will initiate the transfer of the data from the flash buffer chip to a free buffer location in the DMA controller's data buffer. Specifically, engine 303A will request flash buffer chip 307A to forward over the high speed bus 305A the data in its internal buffer which corresponds to data stripe 301A. Engine 303A will then forward acquired data stripe 301A from buffer location 304A to the cache 300. Correspondingly, each engine 303B-303C will forward subsequent data stripe from flash buffer chips 307B-307C to the cache 300. This results to the reconstruction of the original data 301 in the cache 300.

Scatter-Gather Approach Through Bus Striping

Figure 4:
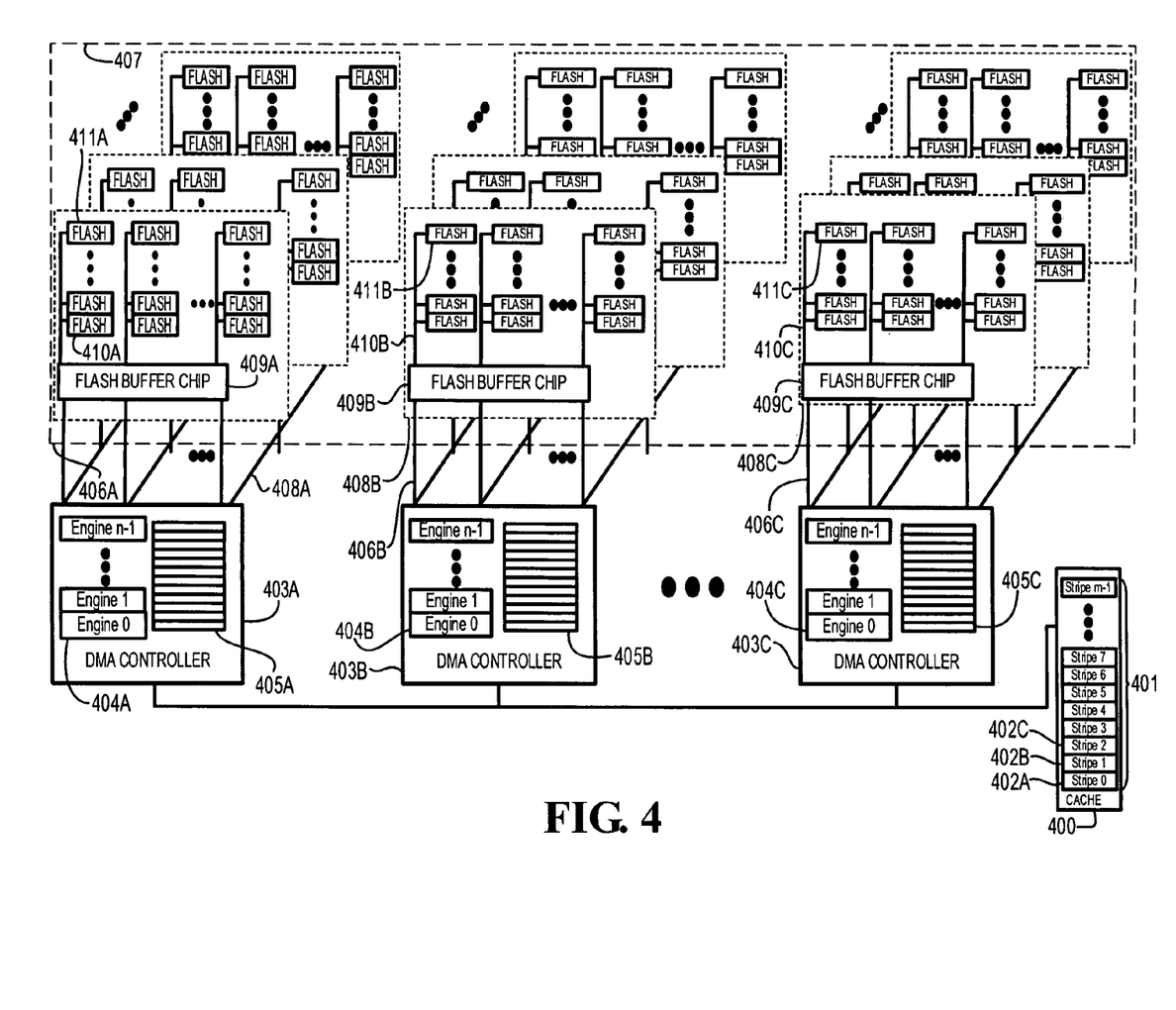
FIG. 4 is a block diagram illustrating a parallel data transfer across a storage array made up of a plurality of flash devices belonging to different flash modules coupled through a plurality of high speed busses in accordance with the present invention.

Bus striping, as illustrated in FIG. 4, is another method used to achieve faster data transfer. This method is faster than the group striping approach because it utilizes the flash buffer chips simultaneously across all busses.

For Write to Flash data transfers, data 401 in the cache 400 is broken into m stripes. Each data stripe 402A-402C will be distributed to the flash devices 411A-411C within each flash module 408A-408C across the storage array 407 coupled to the DMA controllers 403A-403C through high speed busses 406A-406C. The local processor will issue an instruction for each engine 404A-404C in the DMA controller 403A-403C to transfer a stripe of the data 401 in the cache 400. Engine 404A will transfer data stripe 402A to flash device 411A, engine 404B will transfer data stripe 402B to flash device 411B, engine 404C will transfer data stripe 402C to flash device 411C, and so on.

Upon receiving the Write to Flash request from the local processor, engine 404A will fetch data stripe 402A from the cache 400 and transfer it to the data buffer 405A within the DMA controller 403A. As soon as data stripe 402A is transferred, engine 404B in turn initiates the transfer of data stripe 402B from the cache 400 to the data buffer 405B within the DMA controller 403B. Each time that a transfer of a data stripe from the cache to the data buffer is completed, another engine will initiate the transfer for the next data stripe.

Immediately after a certain defined portion of each data stripe from the cache 400 is transferred to the data buffer 405A-405C within the DMA controller 403A-403C, another set of data transfer is to take place in the high speed bus 406A-406C. In the instance that a certain defined portion of the data stripe 402A is in the data buffer 405A within the DMA controller 403A, engine 404A will instruct flash buffer chip 409A to initiate the write operation for flash device 411A. In this phase, engine 404A likewise forwards data stripe 402A from the data buffer 405A within the DMA controller 403A to the data buffer within the flash buffer chip 409A through high speed bus 406A. This transfer between two data buffers is in preparation for the pending write operation to flash device 411A. While this operation is taking place in high speed bus 406A, a similar operation is taking place in high speed bus 406B and high speed bus 406C. These operations occur simultaneously because each DMA controller 403A-403C with its corresponding high speed bus 406A-406C is running independently from each other.

Flash buffer chips 409A, having initiated the write operation for flash device 411A, will transmit data stripe 402A over the flash memory bus 410A. Flash buffer chip 409B, as well, will transmit data stripe 402B to flash device 411B over the flash memory bus 410B. All flash buffer chips involved in the data transfer will go through the same process.

Data transfer from the flash buffer chips 409A-409C to the corresponding flash devices 411A-411C are executed in parallel since different flash buffer chips 409A-409C and consequently different flash memory busses 410A-410C are utilized. That is to say, transfer of data stripes 402B-402C can commence once it gets transferred to flash buffer chips 409B-409C.

In a similar process, a Read from Flash request for the data 401 will result to the local processor generating instructions for each engine 404A-404C in the DMA controller 403A-403C to retrieve simultaneously each corresponding data stripe 402A-402C from the flash devices 411A-411C. After a certain defined portion of the requested data stripes 402A-402C are transferred to the internal buffers of the flash buffer chips 409A-409C, the corresponding engines 404A-404C will initiate the transfer of the data from the flash buffer chips 409A-409C to the data buffer 405A-405C within the DMA controller 403A-403C. Engine 404A will request flash buffer chip 409A to forward over the high speed bus 406A the data in its internal buffer which corresponds to data stripe 402A. Engine 404A will then forward the acquired data stripe 402A from the data buffer 405A within the DMA controller 403A to the cache 400. Each engine 404B-404C will forward the subsequent data stripes from flash buffer chips 409B-409C to the cache 400. This results to the reconstruction of the original data 401 in the cache 400. It is important to note, however, that the cache address where the data 401 will be reconstructed does not necessarily have to be the same cache address used during the write operation.

It should also be noted that the bus striping approach could use any flash device other than flash devices 411A-411C of flash modules 408A-408C as the end destination for any of the data stripes 402A-402C. Furthermore, the bus striping approach is not limited to the use of the first flash modules 408A-408C from each high speed bus 406A-406C. The local processor can choose any flash modules, and consequently any flash device integrated on said flash modules coupled through the high speed busses for the data transfer at hand. In further aspect of the invention, a bus striping approach can be executed with a single DMA controller, in which case the data transfer could involve a single flash module or several flash modules utilizing several high speed busses.

Simply put, data stripes 402A-402C in the cache 400 can be transferred to any flash device in the storage array 407 by using one or any combination of the different methods as discussed above. This gives the local processor maximum control on how the data will be transferred and retrieved.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for optimizing flash device accesses, comprising:

data striping and memory interleaving in a storage array in order to permit a data transfer, wherein the storage array comprises a first flash module, a second flash module and a third flash module;

wherein the data striping and memory interleaving comprise:

data striping, by a plurality of Direct Memory Access (DMA) controllers, a data into a first data stripe, a second data stripe, and a third data stripe, wherein the plurality of DMA controllers comprises a first DMA controller, a second DMA controller, and a third DMA controller, and storing the first data stripe into a first data buffer in the first DMA controller, storing the second data stripe into a second data buffer in the second DMA controller, and storing the third data stripe into a third data buffer in the third DMA controller;

wherein the first flash module is coupled via a first high speed bus to the first Direct Memory Access (DMA) controller, wherein the second flash module is coupled via a second high speed bus to the second DMA controller, and wherein the third flash module is coupled via a third high speed bus to the third DMA controller, respectively;

wherein the first DMA controller, the second DMA controller, and third DMA controller are coupled to a local bus;

wherein the first flash module comprises a first flash buffer chip and a first flash bank, wherein the first flash bank comprises a first plurality of flash devices that are coupled via a first flash memory bus to the first flash buffer chip and wherein the first flash buffer chip is coupled via the first high speed bus to the first DMA controller;

wherein the second flash module comprises a second flash buffer chip and a second flash bank, wherein the second flash bank comprises a second plurality of flash devices that are coupled via a second flash memory bus to the second flash buffer chip and wherein the second flash buffer chip is coupled via the second high speed bus to the second DMA controller;

wherein the third flash module comprises a third flash buffer chip and a third flash bank, wherein the third flash bank comprises a third plurality of flash devices that are coupled via a third flash memory bus to the third flash buffer chip and wherein the third flash buffer chip is coupled via the third high speed bus to the third DMA controller;

wherein the data striping and memory interleaving comprise:

storing, in a first flash device in the first plurality of flash devices in the first flash bank in the first flash module, the first data stripe of the data;

storing, in a second flash device in the second plurality of flash devices in the second flash bank in the second flash module, the second data stripe of the data; and storing, in a third flash device in the third plurality of flash devices in the third flash bank in the third flash module, the third data stripe of the data;

wherein the first DMA controller comprises a first engine and the first data buffer, the second DMA controller comprises a second engine and the second data buffer, the third DMA controller comprises a third engine and the third data buffer;

wherein the first engine transfers the first data stripe between the first flash device in the first flash bank and the first data buffer in the first Direct Memory Access (DMA) controller;

wherein the second engine transfers the second data stripe between the second flash device in the second flash bank and the second data buffer in the second DMA controller;

wherein the third engine transfers the third data stripe between the third flash device in the third flash bank and the third data buffer in the third DMA controller.

2. The method of claim 1 wherein the first flash device and a fourth flash device are in the first flash bank.

3. The method of claim 1 wherein the second flash bank further comprises a fifth flash device.

4. The method of claim 1 wherein the first flash device and a fourth flash device are in the first flash module.

5. The method of claim 1 wherein the second memory module further comprises a fifth flash device.

6. The method of claim 1 wherein the first flash buffer chip is coupled to the first flash bank and a fourth flash bank in the first flash module.

7. The method of claim 1 wherein the second flash buffer chip is coupled to the second flash bank and a fifth flash bank in the second flash module.

8. The method of claim 1 wherein the DMA controllers transfer the data stripes between a cache and the storage array.

9. The method of claim 1, wherein the first engine transfers the first data stripe between the first flash device and the first DMA controller and the second engine transfers the second data stripe between the second flash device and the second DMA controller in parallel.

10. The method of claim 1, wherein the first engine transfers the first data stripe between the first flash device and the first DMA controller and the second engine transfers the second data stripe between the second flash device and the second DMA controller in sequence.

11. An article of manufacture, comprising:

a non-transitory computer-readable medium having stored thereon instructions operable to permit an apparatus to perform a method comprising:

data striping and memory interleaving in a storage array in order to permit a data transfer, wherein the storage array comprises a first flash module, a second flash module and a third flash module;

wherein the data striping and memory interleaving comprise:

data striping, by a plurality of Direct Memory Access (DMA) controllers, a data into a first data stripe, a second data stripe, and a third data stripe, wherein the plurality of DMA controllers comprises a first DMA controller, a second DMA controller, and a third DMA controller, and storing the first data stripe into a first data buffer in the first DMA controller, storing the second data stripe into a second data buffer in the second DMA controller, and storing the third data stripe into a third data buffer in the third DMA controller;

wherein the first flash module is coupled via a first high speed bus to the first Direct Memory Access (DMA) controller, wherein the second flash module is coupled via a second high speed bus to the second DMA controller, and wherein the third flash module is coupled via a third high speed bus to the third DMA controller, respectively;

wherein the first DMA controller, the second DMA controller, and third DMA controller are coupled to a local bus;

wherein the first flash module comprises a first flash buffer chip and a first flash bank, wherein the first flash bank comprises a first plurality of flash devices that are coupled via a first flash memory bus to the first flash buffer chip and wherein the first flash buffer chip is coupled via the first high speed bus to the first DMA controller;

wherein the second flash module comprises a second flash buffer chip and a second flash bank, wherein the second flash bank comprises a second plurality of flash devices that are coupled via a second flash memory bus to the second flash buffer chip and wherein the second flash buffer chip is coupled via the second high speed bus to the second DMA controller;

wherein the third flash module comprises a third flash buffer chip and a third flash bank, wherein the third flash bank comprises a third plurality of flash devices that are coupled via a third flash memory bus to the third flash buffer chip and wherein the third flash buffer chip is coupled via the third high speed bus to the third DMA controller;

wherein the data striping and memory interleaving comprise:

storing, in a first flash device in the first plurality of flash devices in the first flash bank in the first flash module, the first data stripe of the data;

storing, in a second flash device in the second plurality of flash devices in the second flash bank in the second flash module, the second data stripe of the data;

storing, in a third flash device in the third plurality of flash devices in the third flash bank in the third flash module, the third data stripe of the data;

wherein the first DMA controller comprises a first engine and the first data buffer, the second DMA controller comprises a second engine and the second data buffer, the third DMA controller comprises a third engine and the third data buffer;

wherein the first engine transfers the first data stripe between the first flash device in the first flash bank and the first data buffer in the first Direct Memory Access (DMA) controller;

wherein the second engine transfers the second data stripe between the second flash device in the second flash bank and the second data buffer in the second DMA controller;

wherein the third engine transfers the third data stripe between the third flash device in the third flash bank and the third data buffer in the third DMA controller.

12. An apparatus, comprising:

a system comprising a storage array, and a plurality of Direct Memory Access (DMA) controllers comprising a first Direct Memory Access (DMA) controller, a second DMA controller, and a third DMA controller;

wherein the system is configured to perform data striping and memory interleaving in the storage array in order to permit a data transfer, wherein the storage array comprises a first flash module, a second flash module and a third flash module;

wherein the system is configured to perform the data striping and memory interleaving comprising:

data striping, by the plurality of Direct Memory Access (DMA) controllers, a data into a first data stripe, a second data stripe, and a third data stripe, and storing the first data stripe into a first data buffer in the first DMA controller, storing the second data stripe into a second data buffer in the second DMA controller, and storing the third data stripe into a third data buffer in the third DMA controller;

wherein the first flash module is coupled via a first high speed bus to the first DMA controller, wherein the second flash module is coupled via a second high speed bus to the second DMA controller, and wherein the third flash module is coupled via a third high speed bus to the third DMA controller, respectively;

wherein the first DMA controller, the second DMA controller, and third DMA controller are coupled to a local bus;

wherein the first flash module comprises a first flash buffer chip and a first flash bank, wherein the first flash bank comprises a first plurality of flash devices that are coupled via a first flash memory bus to the first flash buffer chip and wherein the first flash buffer chip is coupled via the first high speed bus to the first DMA controller;

wherein the second flash module comprises a second flash buffer chip and a second flash bank, wherein the second flash bank comprises a second plurality of flash devices that are coupled via a second flash memory bus to the second flash buffer chip and wherein the second flash buffer chip is coupled via the second high speed bus to the second DMA controller;

wherein the third flash module comprises a third flash buffer chip and a third flash bank, wherein the third flash bank comprises a third plurality of flash devices that are coupled via a third flash memory bus to the third flash buffer chip and wherein the third flash buffer chip is coupled via the third high speed bus to the third DMA controller;

wherein the first DMA controller comprises a first engine and the first data buffer, the second DMA controller comprises a second engine and the second data buffer, the third DMA controller comprises a third engine and the third data buffer;

wherein the first engine transfers the first data stripe between a first flash device in the first flash bank and the first data buffer in the first Direct Memory Access (DMA) controller;

wherein the second engine transfers the second data stripe between a second flash device in the second flash bank and the second data buffer in the second DMA controller;

wherein the third engine transfers the third data stripe between a third flash device in the third flash bank and the third data buffer in the third DMA controller.

13. The apparatus of claim 12 wherein the first flash device and a fourth flash device are in the first flash bank.

14. The apparatus of claim 12 wherein the second flash bank further comprises a fifth flash device.

15. The apparatus of claim 12 wherein the first flash device and a fourth flash device are in the first flash module.

16. The apparatus of claim 12 wherein the second memory module further comprises in a fifth flash device.

17. The apparatus of claim 12 wherein the first flash buffer chip is coupled to the first flash bank and a fourth flash bank in the first flash module.

18. The apparatus of claim 12 wherein the second flash buffer chip is coupled to the second flash bank and a fifth flash bank in the second flash module.

19. The apparatus of claim 12 wherein the DMA controllers transfer the data stripes between a cache and the storage array.

20. The apparatus of claim 12, wherein the first engine transfers the first data stripe between the first flash device and the first DMA controller and the second engine transfers the second data stripe between the second flash device and the second DMA controller in parallel.

* * * * *